United States Patent [19]

Barthold et al.

[11] Patent Number: 4,935,162

[45] Date of Patent: Jun. 19, 1990

[54] ALKOXYLATED AMIDO-CONTAINING POLYAMINES AND THEIR USE FOR BREAKING OIL-IN-WATER AND WATER-IN-OIL EMULSIONS

[75] Inventors: Klaus Barthold, Mannheim; Richard Baur, Mutterstadt; Rolf Fikentscher, Ludwigshafen; Juergen Lasowski, Limburgerhof; Knut Oppenlaender, Ludwigshafen, all of Fed. Rep. of Germany

[73] Assignee: BASF Aktiengesellschaft, Ludwigshafen, Fed. Rep. of Germany

[21] Appl. No.: 109,041

[22] Filed: Oct. 16, 1987

[30] Foreign Application Priority Data

Oct. 16, 1986 [DE] Fed. Rep. of Germany ....... 3635235

[51] Int. Cl.$^5$ .............................................. B01D 17/04
[52] U.S. Cl. .................................... 252/344; 525/420; 528/342; 528/422; 252/344
[58] Field of Search ....................... 252/344, 341, 358; 528/342, 422, 324, 310; 525/420, 419

[56] References Cited

U.S. PATENT DOCUMENTS

| | | | |
|---|---|---|---|
| 2,499,368 | 3/1950 | Groote et al. | 252/331 |
| 3,528,928 | 9/1970 | Rushton et al. | 252/341 |
| 3,893,885 | 7/1975 | Ziemann et al. | 162/164 |
| 3,907,701 | 9/1975 | Liebold et al. | 252/341 |
| 4,250,298 | 2/1981 | Lehmann et al. | 528/342 |
| 4,546,151 | 10/1985 | Baur et al. | |

FOREIGN PATENT DOCUMENTS

| | | |
|---|---|---|
| 2227546 | 1/1974 | Fed. Rep. of Germany . |
| 3300866 | 7/1984 | Fed. Rep. of Germany . |
| 3404538 | 8/1985 | Fed. Rep. of Germany . |
| 865727 | 7/1951 | United Kingdom . |

*Primary Examiner*—Josephine Barr
*Attorney, Agent, or Firm*—Keil & Weinkauf

[57] ABSTRACT

Alkoxylated amido-containing polyamines which are suitable as oil demulsifiers are obtainable by condensing a dicarboxylic acid of 3 to 20 carbon atoms or one of its functional derivatives with a polyalkylenepolyamine having 2 or more carbon atoms and 2 or more amino groups and reacting the product with a total of from 1 to 200 moles/mole of ethylene oxide and/or propylene oxide and/or 1,2-butylene oxide.

7 Claims, No Drawings

ALKOXYLATED AMIDO-CONTAINING POLYAMINES AND THEIR USE FOR BREAKING OIL-IN-WATER AND WATER-IN-OIL EMULSIONS

The present invention relates to novel compounds which are suitable as oil demulsifiers and based on alkoxylated amido-containing polyamines, and their use for breaking water-in-oil and water-in-oil emulsions.

In the production and further processing of crude oil, large amounts of water-in-oil and oil-in-water emulsions are obtained, the continuous outer phase depending on the proportions of water to oil, the emulsifier system and the history of formation of the emulsion. During production, the major part of the crude oil is obtained in the form of a water-in-oil emulsion, which must be broken by adding chemical demulsifiers. Widely used demulsifiers are ethylene oxide/propylene oxide block copolymers, alkoxylated alkylphenol/formaldehyde resins, alkoxylated polyamines and derivatives of these basic classes. Typical members of these classes are described in French Patent 1,069,615, U.S. Pat. No. 2,499,368 and German Patent 2,227,546.

Oil-in-water emulsions also occur during production, but mainly during further processing of the crude oil at the fields and in the refineries. The amount of emulsified crude oil may be up to 5%. This residual oil content is separated off using special demulsifiers, ie. deoilers, which are generally cationic polymers, as described in, for example, DE-34 04 538. Typical products are described in U.S. Pat. No. 3,528,928.

It is an object of the present invention to provide highly effective demulsifiers for oil-in-water and water-in-oil emulsions, the said demulsifiers being superior to the conventional demulsifiers in respect of universal applicability, breaking rate and residual oil content and residual water content.

We have found that this object is achieved in accordance with the present invention, and that these advantages are possessed by alkoxylated, amido-containing polyamines, obtainable by condensing a dicarboxylic acid of 3 to 20 carbon atoms or one of its functional derivatives with a polyalkylenepolyamine having 2 or more carbon atoms and 2 or more amino groups, and reacting the product with a total of from 1 to 200 moles/mole of ethylene oxide and/or propylene oxide and/or 1,2-butylene oxide.

Preferred and particularly effective alkoxylated amido-containing polyamines are those obtainable by condensing

where R is a divalent radical of an alkane or alkene of 1 to 17 carbon atoms or an unsubstituted or substituted phenylene radical, with a polyalkylenepolyamine of the formula

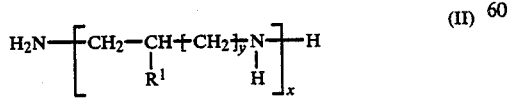

where $R^1$ is hydrogen or methyl, y is 0 or 1 and x is from 1 to 5, and alkoxylating the product with from 1 to 200 moles of ethylene oxide, propylene oxide and/or 1,2-butylene oxide per mole of polyamine.

Finally, in these alkoxylated amido-containing polyamines, some or all of the basic tertiary N atoms may also be alkylated.

The novel alkoxylated, amido-containing polyamines are advantageously prepared by a method in which (a) a dicarboxylic acid of 3 to 20 carbon atoms, or one of its functional derivatives, is condensed with a polyamine of 2 to 20 carbon atoms and 2 to 5 nitrogen atoms at from 150 to 300° C. with or without removal of the water of reaction, (b) the reaction product is alkoxylated with from 1 to 200 moles of ethylene oxide, propylene oxide or 1,2-butylene oxide per mole of the polyamine, in the presence of an alkaline catalyst at from 110° to 140° C. and, if required, (c) some or all of the basic tertiary nitrogen atoms of the alkoxylate are alkylated.

The condensation of the polyamines with the dicarboxylic acids is carried out by methods as described in, for example, German Patents 1,177,824, 1,771,814 and 2,756,469.

According to the present invention, particularly suitable dicarboxylic acids and their functional derivatives are those of the general formula III

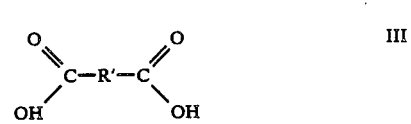

where R' is a radical

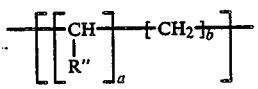

or

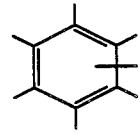

or

where R" is H, CH₃ or OH, a is from 0 to 5, b is from to 15, a+b is not less than 1, c is 1 or 2 and d is from 0 to 3, and the phenylene radical may be substituted by OH, the said dicarboxylic acids or their derivatives being condensed with polyalkylenepolyamines of the general formula IV

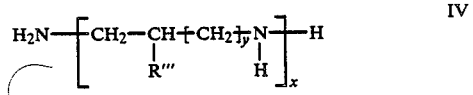

where R''' is H or CH₃, y is 0 or 1 and x is from 1 to 5, in a ratio of from 1:0.8 to 1:1.4, preferably from 1:1 to 1:1.1.

Specific examples of dicarboxylic acids of the general formula III and their functional derivatives are succinic acid, glutaric acid, adipic acid, maleic acid, fumaric acid, diglycollic acid, terephthalic acid and isophthalic acid.

Particularly suitable polyalkylenepolyamines of the general formula IV are ethylenediamine, 1,2-propylenediamine, 1,3-propylenediamine, diethylenetriamine, dipropylenetriamine, triethylenetetramine, their mixtures and the residues remaining in the synthesis of the polyalkylenepolyamines.

The amido-containing polyamines are prepared by a conventional process, by condensation of the dicarboxylic acids or their derivatives and the polyalkylenepolyamines, with or without removal of the water of reaction, at from 100 to 300° C. in the absence of oxygen.

Alkoxylation of the amido-containing polyamines with ethylene oxide and/or propylene oxide and/or 1,2butylene oxide, blockwise or as mixed oxides, gives compounds of the general formula V

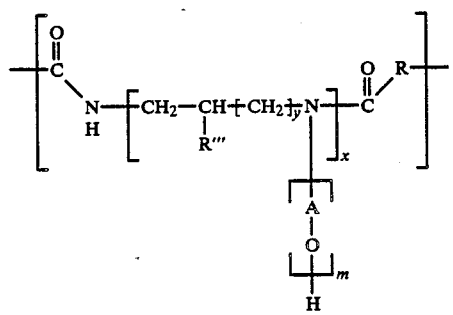

where m is from 1 to 200 and the radicals A-O are identical or different radicals of ethylene oxide, propylene oxide or butylene oxide, and R, R''', x and y have the above meanings. The alkoxylation is carried out using a conventional method, as described in, for example, German Patent 2,227,546.

For example, in the first stage, the alkylene oxide is allowed to act on the amido-containing polyamine, in the presence of 150% by weight of water in a pressure vessel at about 80–100° C, in an amount such that all secondary amino groups are converted to form the corresponding aminoalcohol. After removal of the water, if necessary under reduced pressure, the desired alkoxide or alkoxides are metered into a pressure vessel continuously at from 110 to 140° C. in the presence of a known basic catalyst, preferably potassium hydroxide or sodium hydroxide in an amount of from 0.2 to 5% by weight, based on anhydrous aminoalcohol of the first stage. It is preferable to use ethylene oxide alone or propylene oxide alone or propylene oxide and ethylene oxide; the two last-mentioned compounds may be reacted in the form of a mixture or in succession with formation of polymer blocks. Depending on the amounts of ethylene oxide and propylene oxide, the products obtained have medium to high viscosity; those which have an average to high ethylene oxide content are water-soluble, whereas products containing predominantly propylene oxide are water-insoluble.

Particularly when the products are used as demulsifiers for oil-in-water emulsions, it is advantageous if modification of the alkoxylated amido-containing polyamines is followed by alkylation of the basic tertiary nitrogen atoms. Suitable alkylating agents are alkyl halides, epichlorohydrin, alkyl iodides, dihaloalkanes, alkylating aromatic halides and dimethyl sulfate, preferably methyl chloride, methyl iodide, benzyl chloride, dimethyl sulfate, epichlorohydrin and xylylene dichloride. Complete alkylation of all basic nitrogen atoms or partial alkylation may be carried out. Preferably, from 50 to 100% of the basic nitrogen atoms are alkylated. The weight ratios of alkoxylated amido-containing polyamines to alkylating reagent are from 1,000:1 to 1:10. The alxylation may be effected by a conventional process, in aqueous solution at from 20 to 150° C, under atmospheric or superatmospheric pressure. The conversion of the alkylation reaction can readily be obtained by determining the basic nitrogen valencies still present.

EXAMPLES

(A) Amido-containing polyamines

The amido-containing polyamines are prepared by the processes described in German Patents 1,177,824 and 1,771,814.

(1) To synthesize an adipic acid/diethylenetriamine polyamidoamine, 218 g (2.12 moles) of diethylenetriamine are mixed with 282 g (1.94 moles) of adipic acid and 100 g of water, and the mixture is slowly heated to 120° C. The temperature is increased to 160° C. in the course of 2 hours, the solvent and the water of reaction being distilled off. After cooling to about 80° C., the reaction product is dissolved in 500 g of water.

(B) Alkoxylation of the amido-containing polyamines (1) 1,000 g of the condensate from Example A1) are initially taken in an autoclave, and 102 g of ethylene oxide are metered in at from 90 to 100° C. under a nitrogen atmosphere. The product is obtained in the form of a viscous aqueous solution containing 54.6% of the active ingredient.

(2) The water is distilled off from the solution of Example B1) under reduced pressure. 25 g of KOH are added to 500 g of the resulting product of medium viscosity in an autoclave, and the mixture is reacted with 4,220 g of propylene oxide at from 120 to 130° C. The product is obtained as a highly viscous, pale yellow substance.

(3) 7 g of KOH are added to 300 g of the product from Example B2) in an autoclave, and 48 g of ethylene oxide are metered in at 120° C.

(4) The water is distilled off from the solution of Example B1) under reduced pressure. 10 g of KOH are added to 1,000 g of the resulting product in an autoclave, and the mixture is reacted with 685 g of ethylene oxide at from 110 to 130° C. A wax-like product is obtained.

(C) Alkylation of the alkoxylated amido-containing polyamines from B)

(1) 500 g of the aqueous solution of the product from B1) are diluted with 46 g of water, and 130 g of dimethyl sulfate are added in the course of one hour at 30° C. The temperature is kept at 30° C. by cooling. When the addition is complete, the reaction is allowed to continue for a further 4 hours at 40° C.

(2) 430 g of the product from Example B4) are diluted with 430 g of water and heated to 40° C. 71 g of methyl iodide are added dropwise in the course of one hour, the temperature being kept at 40° C. The mixture is then heated at 65–70° C for a further 4 hours.

EXAMPLE OF USE

Test emulsion=crude oil from northern Germany
Water content: 50% Breaking temperature: 50° C

| Demulsifier | Amount used ppm | Water separation in % after | | | | | | |
|---|---|---|---|---|---|---|---|---|
| | | 10' | 20' | 30' | 45' | 60' | 2 h | 4 h |
| Demulsifier according to Example 1b, U.S. Pat. No. 2,499,368 | 20 | 0 | 0 | 1 | 2 | 2 | 4 | 8 |
| Demulsifier according to German Patent 2,227,546 | 20 | 0 | 2 | 5 | 10 | 13 | 21 | 24 |
| Demulsifier of Example (B3) of the present invention | 20 | 2 | 12 | 31 | 47 | 73 | 98 | 99 |
| Blank value | — | 0 | 0 | 0 | 0 | 0 | 1 | 2 |

We claim:

1. An alkoxylated amido-containing polyamide which is suitable for use as an oil demulsifier and is obtained by condensing a dicarboxylic acid of the formula $$HOOC-R-COOH \qquad I$$

where R is a divalent radical of an alkane or alkene of 1 to 17 carbon atoms or an unsubstituted or substituted phenylene radical, with a polyalkylenepolyamine of the formula

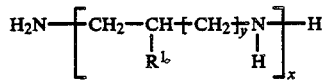

where $R^1$ is hydrogen or methyl, y is 0 or 1 and x is from 1 to 5, and alkoxylating the product with from 1 to 200 moles of ethylene oxide, propylene oxide or 1,2-butylene oxide or mixtures thereof per mole of polyamine.

2. An alkylated alkoxylated amido-containing polyamine as defined in claim 1, wherein from 50 to 100% of the basic tertiary nitrogen atoms are alkylated.

3. An alkylated alkoxylated amido-containing polyamine as defined in claim 2, wherein from 50 to 100% of the basic tertiary nitrogen atoms are alkylated.

4. An alkylated alkoxylated amido-containing polyamine as defined in claim 2 which are obtained by reacting an alkoxylated amido-containing polyamine as defined in claim 2 with an alkylating agent, the weight ratios of alkoxylated amido-containing polyamine to alkylating agent being from 1,000:1 to 1:10.

5. A process for the preparation of an alkoxylated amido-containing polyaminer as defined in claim 1, wherein
   (a) a dicarboxylic acid of 3 to 20 carbon atoms, or one of its functional derivatives, is condensed with a polyamine of 2 to 20 atoms and 2 to 5 nitrogen atoms at from 150 to 300° C., with or without removal of the water of reaction, and the reaction product is alkoxylated with from 1 to 200 moles of ethylene oxide, propylene oxide or 1,2-butylene oxide per mole of the polyamine, in the presence of an alkaline catalyst at from 110° to 140° C.

6. A process for the preparation of an alkylation product of the amido-contining polyamine as defined in claim 1, wherein the amido-containing polyamine is reacted with an alkylating agent, the weight ratio of alkoxylated amido-containing polyamine to alkylating agent being from 1,000:1 to 1:10.

7. A process for rapidly dewatering crude oil, wherein the crude oil is contacted with an alkoxylated amido-containing polyamide as defined in claim 1.

* * * * *

UNITED STATES PATENT AND TRADEMARK OFFICE
CERTIFICATE OF CORRECTION

PATENT NO. : 4,935,162

DATED : June 19, 1990

INVENTOR(S) : Klaus BARTHOLD et al.

It is certified that error appears in the above-identified patent and that said Letters Patent is hereby corrected as shown below:

Claim 1, Column 5, Line 17

"polyamide" should read --polyamine--

Claim 4, Column 6, Line 10

"are" should read --is--

Claim 5(a), Column 6, Line 20

"2 to 20 atoms" should read --2 to 20 carbon atoms--

Claim 7, Column 6, Line 35

"polyamide" should read --polyamine--

Signed and Sealed this

Eighth Day of October, 1991

Attest:

HARRY F. MANBECK, JR.

*Attesting Officer*      *Commissioner of Patents and Trademarks*